US009969222B2

(12) United States Patent
Fugier et al.

(10) Patent No.: US 9,969,222 B2
(45) Date of Patent: May 15, 2018

(54) TIRE TREAD

(75) Inventors: Sébastien Fugier, Clermont-Ferrand (FR); Nicolas Jamot, Clermont-Ferrand (FR); Bertrand Fraenkel, Clermont-Ferrand (FR)

(73) Assignees: COMPAGNIE GENERALE DES ETABLISSEMENTS MICHELIN, Clermont-Ferrand (FR); MICHELIN RECHERCHE ET TECHNIQUE S.A., Granges-Paccot (CH)

( * ) Notice: Subject to any disclaimer, the term of this patent is extended or adjusted under 35 U.S.C. 154(b) by 822 days.

(21) Appl. No.: 13/821,409

(22) PCT Filed: Sep. 8, 2011

(86) PCT No.: PCT/EP2011/065563
§ 371 (c)(1),
(2), (4) Date: Mar. 29, 2013

(87) PCT Pub. No.: WO2012/032123
PCT Pub. Date: Mar. 15, 2012

(65) Prior Publication Data
US 2013/0206295 A1 Aug. 15, 2013

(30) Foreign Application Priority Data
Sep. 10, 2010 (FR) ...................................... 10 57202

(51) Int. Cl.
*B60C 11/12* (2006.01)
*B60C 11/11* (2006.01)
*B60C 11/03* (2006.01)

(52) U.S. Cl.
CPC ........... *B60C 11/0304* (2013.01); *B60C 11/11* (2013.01); *B60C 11/12* (2013.01); *B60C 2011/1209* (2013.01); *B60C 2011/129* (2013.01)

(58) Field of Classification Search
CPC ............. B60C 11/0304; B60C 11/0306; B60C 11/0318; B60C 11/124; B60C 11/1236;
(Continued)

(56) References Cited

FOREIGN PATENT DOCUMENTS

EP 0718125 * 6/1996
EP 1 795 372 A2 6/2007
(Continued)

OTHER PUBLICATIONS

JP 2007-153056, Jun. 21, 2007, English language machine translation, www.epo.org.*
(Continued)

*Primary Examiner* — Eric Hug
(74) *Attorney, Agent, or Firm* — Dickinson Wright PLLC

(57) ABSTRACT

The invention relates to an asymmetric tread for a tire comprising a plurality of basic patterns, for each of which there is defined a sipes density corresponding to $$\frac{\sum_i l_i}{P * Wm}$$

where i is the number of sipes in the pattern, li is the length of the $i^{th}$ sipe on the tread surface, P is the pitch of the basic pattern and Wm is the width of the basic pattern, a sipes orientation level corresponding to $$\frac{\sum_i |l_i * \alpha_i|}{P * Wm},$$

where αi is the positive or negative angle formed on the tread surface by the $i^{th}$ sipe with the transverse direction and |αi|≤45 degrees and a steering pull criterion for the basic pattern corresponding to $$\left| \frac{\sum_i l_i * \alpha_i}{\sum_i |l_i * \alpha_i|} \right|.$$

(Continued)

The sipes density is greater than or equal to 60 μm/mm², the sipes orientation level is greater than or equal to 1.5 degrees/mm and the steering pull criterion for the pattern is less than or equal to 0.2. The tread comprises an inboard half-tread adjacent to an inboard sidewall of the tire, the sipes orientation level relating to the inboard half-tread being greater than 2 degrees/mm.

3 Claims, 2 Drawing Sheets

(58) Field of Classification Search
CPC ............. B60C 2011/1209; B60C 11/01; B60C 11/12; B60C 11/03; B60C 2011/129; B60C 2011/1295
USPC .......................................... 152/209.8, 209.18
See application file for complete search history.

(56) References Cited

FOREIGN PATENT DOCUMENTS

| JP | 2007-153056 | * | 6/2007 |
|---|---|---|---|
| JP | 2007-153056 A | | 6/2007 |
| JP | 2009-67344 A | | 4/2009 |

OTHER PUBLICATIONS

International Search Report (PCT/ISA/210) dated Sep. 29, 2011, by the European Patent Office as the International Searching Authority for International Application No. PCT/EP2011/065563.

* cited by examiner

TIRE TREAD

BACKGROUND

Field

Disclosed herein is a tire tread with an asymmetric tread pattern design. The invention relates in particular to treads for winter driving which are intended to be fitted to passenger vehicles.

Description of Related Art

In order to ensure good grip on snowy ground, it is known practice to provide the treads with sipes.

It is also known practice for these sipes to be inclined on the tread surface with respect to the transverse direction in order to guarantee grip on snowy ground, particularly in bends.

However, on dry ground, the presence of inclined sipes may create a problem of lateral pull, which therefore disturbs the driving of the vehicle.

It is therefore an object of the present invention to provide a tread for winter driving that has good grip on snowy ground while at the same time limiting the problems of lateral pull on dry ground.

Definitions

A "tire" means all types of resilient tread whether or not during driving it is subjected to an internal pressure.

The "tread of a tire" means a quantity of rubber compound delimited by lateral surfaces and by two main surfaces, one of which is intended to come into contact with the ground when the tire is being driven.

A "tread surface" means the surface formed by those points of the tread of the tire that come into contact with the ground when the tire is being driven.

An "asymmetric tread" means a tread with a tread pattern design that is not symmetric about a median plane of the tire.

A "basic pattern" means a particular grouping of raised elements. The basic patterns of the tread are derived from one and the same elementary pattern, but may be on different scales.

The "pitch of a basic pattern" means the length of the said basic pattern in a circumferential direction X.

A "groove" means a "cut-out" of which the faces of material do not touch under normal running conditions. In general, the width of a groove is greater than or equal to 1 mm.

A "sipe" means a cut-out of which the faces of material touch under normal running conditions. In general, the width of a sipe is less than 1 mm and the depth of the sipe in the tread is greater than or equal to 3 mm.

"Lateral pull" means the tendency that a vehicle may have to deviate from a straight-line trajectory outside of any action by the driver on the steering wheel. Lateral pull is notably present when the driver is transmitting a braking or driving torque to the tire.

A "circumferential direction" means a direction tangential to a circle, the centre of which is on the axis of rotation of the tire.

A "transverse direction" means a direction parallel to the axis of rotation of the said tire.

A "radial direction" means any direction perpendicular to the axis of rotation of the tire.

SUMMARY

Disclosed herein is an asymmetric tread for a tire intended to be fitted to a motor vehicle. The said tread comprises a tread surface intended to be in contact with a roadway when the tire is being driven. The said tread comprises a sequence of basic patterns arranged in the circumferential direction, each basic pattern extending over at least 80% of the width of the tread. Each basic pattern comprises a plurality of raised elements provided with sipes opening onto the tread surface, each sipe having a width less than 1 mm and a depth of at least 3 mm. For each basic pattern, there is defined a sipes density corresponding to $$\frac{\sum_i li}{P*Wm}$$

where i is the number of sipes in the pattern, $li$ is the length of the $i^{th}$ sipe on the tread surface, P is the pitch of the basic pattern and Wm is the width of the basic pattern. There is also defined a sipes orientation level corresponding to $$\frac{\sum_i |li*\alpha i|}{P*Wm},$$

where $\alpha i$ is the positive or negative angle formed on the tread surface by the $i^{th}$ sipe with the transverse direction and $|\alpha i| \leq 45$ degrees. Finally there is defined a steering pull criterion for the basic pattern corresponding to $$\left|\frac{\sum_i li*\alpha i}{\sum_i |li*\alpha i|}\right|.$$

The tread that forms the subject matter of the invention is notable in that the sipes density is greater than or equal to 60 μm/mm², the sipes orientation level is greater than or equal to 1.5 degrees/mm and the steering pull criterion for the pattern is less than or equal to 0.2. The tread comprises an inboard half-tread adjacent to an inboard sidewall of the tire, the sipes orientation level relating to the inboard half-tread being greater than 2 degrees/mm.

The inclined sipes form inclined edges on the tread surface of the tread. Dry ground induces significant longitudinal forces on the tread of the tire. Under the effect of these longitudinal forces, part of the inclined edges formed by the sipes generate residual transverse forces which can be transmitted to the vehicle steering.

By choosing the orientation and length of the sipes in the tread according to the criteria of the invention, it is possible to ensure that the lateral pull effects associated with the sipes compensate for one another, at least in part, at the level of each basic pattern of the tire. In this way, the overall lateral pull of the tire when driven on dry ground is limited, while at the same time the grip of this tire on snowy ground is improved.

Furthermore, by choosing a sipes orientation level for the sipes relating to the inboard half-tread greater than 2 degrees/mm, it is possible to ensure good grip under cornering on snowy ground while at the same time overall limiting the lateral pull on dry ground.

For preference, the steering pull criterion is less than 0.1. The overall lateral pull of the vehicle when running on dry ground is limited further.

For preference, the steering pull criterion is less than 0.05. The overall lateral pull of the vehicle when running on dry ground is limited even further.

BRIEF DESCRIPTION OF THE DRAWINGS

Further features and advantages of the invention will become apparent from the following description, given by way of nonlimiting example, with reference to the attached drawings in which.

DETAILED DESCRIPTION OF SPECIFIC EMBODIMENTS

In the description that is to follow, elements that are identical or similar will be denoted by identical references.

Figure 1:
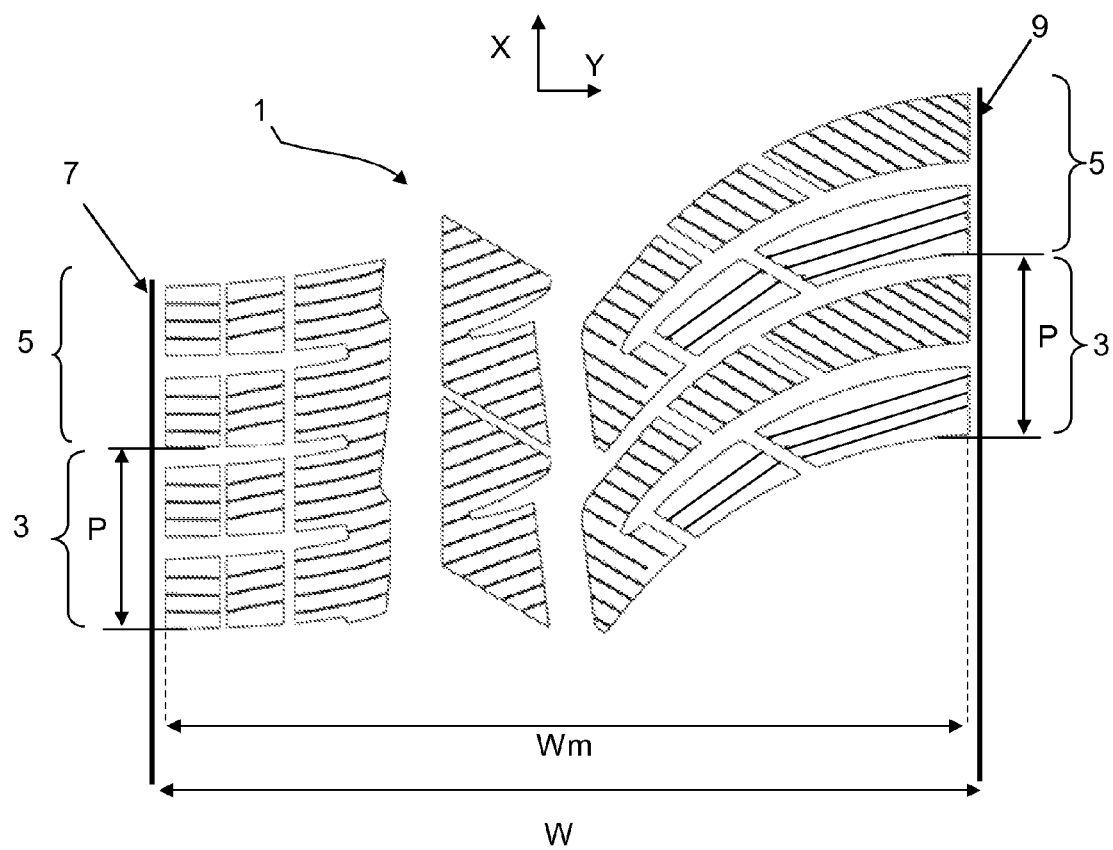
FIG. 1 schematically depicts a partial view of a tread of a tire according to the invention.

FIG. 1 partially depicts the tread surface of a tread 1.

The tread 1 comprises a sequence of n basic tread patterns 3, 5 arranged in the circumferential direction X, where n is a natural integer greater than or equal to 1. To make FIG. 1 easier to understand, only a first basic pattern 3 and a second basic pattern 5 have been depicted.

Each basic pattern 3, 5 extends in the circumferential direction X at a determined pitch P.

The pitch of the first basic pattern 3 here is identical to the pitch of the second basic pattern 5. As an alternative, the pitches of the basic patterns are different.

Each basic pattern 3, 5 extends over at least 80% of the width W of the tread. In the example of FIG. 1, the width Wm of the basic pattern 3, 5 here is substantially identical to the width W of the tread.

The width W of the tread corresponds to the distance between a first axial edge 7 and a second axial edge 9 of the tread.

Figure 2:
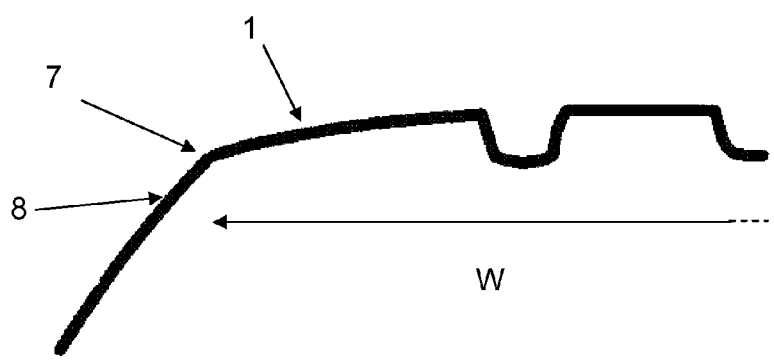
FIG. 2 schematically illustrates how the axial edge of a tread is determined according to a first determination method.
Figure 3:
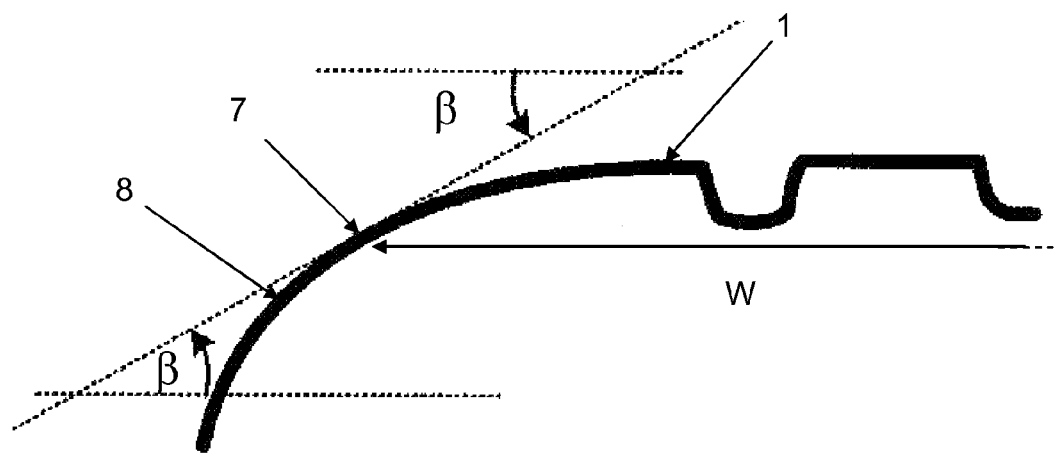
FIG. 3 schematically illustrates how the axial edge of a tread is determined according to a second determination method.

The way in which the width W of a tread is determined is illustrated in FIGS. 2 and 3, each of which show the partial profile of a tread 1 and part of a side wall 8 adjacent to it. In certain designs of tire, the transition from the tread to the side walls is very clear cut, as in the case depicted in FIG. 2, and the first axial edge 7 and the second axial edge (not depicted) can be determined intuitively.

However, there are tire designs in which the transition between the tread and the side walls is continuous. An example is depicted in FIG. 3.

In this FIG. 3, the first axial edge 7 and the second axial edge of the tread are determined as follows. On a radial section through the tire, the tangent to the tread surface at every point on the said tread surface in the region of transition toward the side wall is plotted. The first axial edge 7 is the point at which the angle β (beta) between the said tangent and an axial direction is equal to 30°. When there are a number of points for which the angle β between the said tangent and an axial direction is equal to 30°, the point adopted is the radially outermost one. The same procedure is followed in order to determine the second axial edge of the tread.

Figure 4:
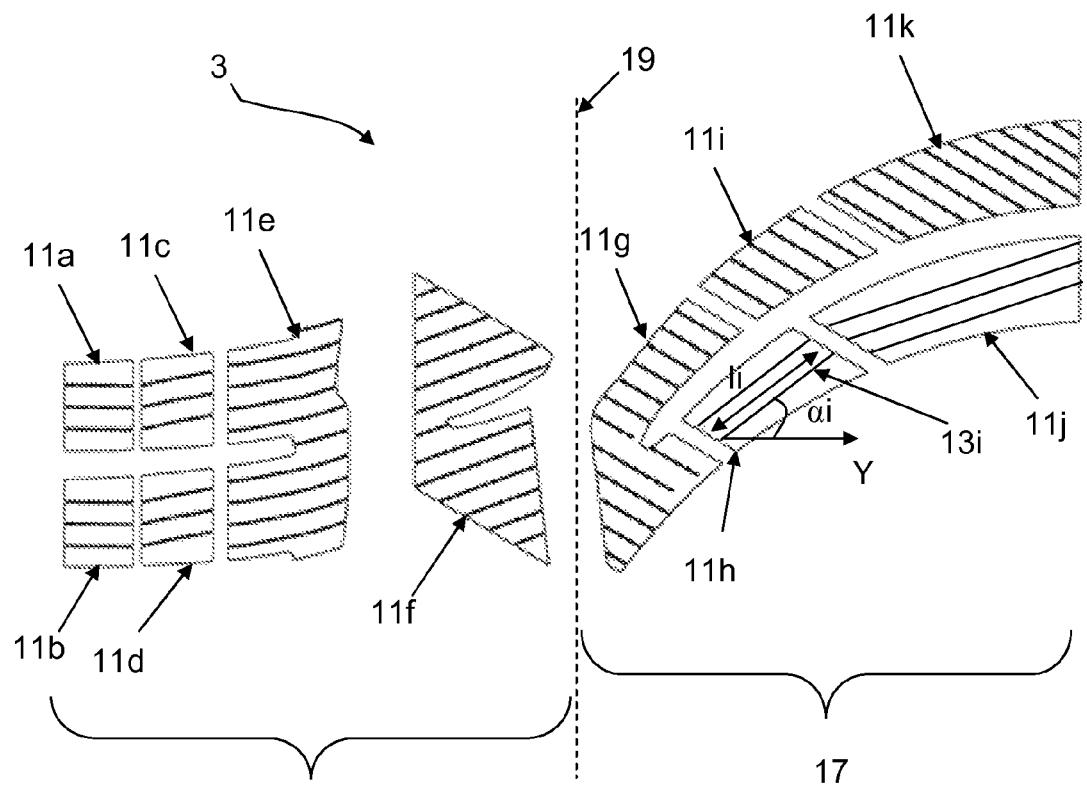
FIG. 4 more specifically schematically depicts a basic tread pattern of the tread of FIG. 1.

FIG. 4 more particularly depicts the first basic pattern 3 of FIG. 1.

The first basic pattern 3 here comprises 11 raised elements, respectively termed the first raised element 11a, second raised element 11b, third raised element 11c, fourth raised element 11d, fifth raised element 11e, sixth raised element 11f, seventh raised element 11g, eighth raised element 11h, ninth raised element 11i, tenth raised element 11j, eleventh raised element 11k.

The first basic pattern 3 is provided with i sipes 13i opening onto the tread surface, where i is a natural integer greater than 1.

The i sipes are distributed across the various raised elements 11a-11k.

For each sipe 13i it is possible to determine a sipe length li corresponding to the length of the line of the said sipe on the tread surface.

An angle $\alpha i$ (alpha i) is also determined for each sipe 13i, where $|\alpha i| \leq 45$ degrees. The angle $\alpha I$ corresponds to the angle formed by the $i^{th}$ sipe 13i with the transverse direction Y.

The way in which the angles of the sipes are defined is explained later on in the description.

The sipe angle is said to be positive with respect to the transverse direction Y if the rotation that brings the said transverse direction Y onto the line of the sipe on the tread surface is in the counterclockwise direction.

Conversely, the sipe angle is said to be negative with respect to the transverse direction Y if the rotation that brings the said transverse direction Y onto the line of the sipe on the tread surface is in the clockwise direction.

Thus, the first element 11a and the second element 11b have sipes that form an angle that is zero overall with the transverse direction Y.

Likewise, the third element 11c, the fourth element 11d, the fifth element 11e, the sixth element 11f, the eighth element 11h and the tenth element 11j have sipes that form a positive angle with the transverse direction Y.

Finally, the seventh element 11g, the ninth element 11i and the eleventh element ilk have sipes that form a negative angle with the transverse direction Y.

A sipes density D, a sipes orientation level NO and a steering pull criterion CT are also defined for the basic pattern 3.

The sipes density D corresponds to the equation $$\frac{\sum_i li}{P * Wm}.$$

Remember that i is the number of sipes in the basic pattern, li is the length of the $i^{th}$ sipe on the tread surface, P is the pitch of the basic pattern and Wm is the width of the basic pattern.

The sipes orientation level NO corresponds to the equation $$\frac{\sum_i |li * \alpha i|}{P * Wm}.$$

Remember that $\alpha i$ is the positive or negative angle formed on the tread surface by the $i^{th}$ incision with the transverse direction Y and $|\alpha i| \leq 45$ degrees.

The steering pull criterion CT for the basic pattern corresponds to the equation $$\left|\frac{\sum_i li * \alpha i}{\sum_i |li * \alpha i|}\right|.$$

The number of sipes 13*i* in the basic pattern 3, the length of the sipes and the angle of the sipes are determined so that the sipes density is greater than 60 μm/mm², the sipes orientation level is greater than 1.5 degrees/mm and the steering pull criterion for the pattern is less than 0.2.

In this way a low degree of lateral pull of the tire when driven on dry ground is guaranteed, while at the same time maintaining a good level of grip for this tire on snowy ground.

Advantageously, the steering pull criterion for the pattern is less than 0.1.

In another alternative form, the steering pull criterion for the pattern is less than 0.05.

By way of example, the characteristics of the sipes present in the various raised elements of FIG. 4 have been listed in the table below. In this table, the first row references the various raised elements of the basic pattern 3, the second row details the angles of the sipes associated with the various raised elements, and the third row details the total length of the sipes present in the various raised elements.

| Raised elements | 11a | 11b | 11c | 11d | 11e | 11f | 11g | 11h | 11i | 11j | 11k |
|---|---|---|---|---|---|---|---|---|---|---|---|
| Angle of the sipes in degrees | 0 | 0 | 4.5 | 4.5 | 12 | 20 | −30 | 35 | −30 | 18 | −30 |
| Total length of sipes (mm) | 50 | 50 | 50 | 50 | 250 | 245 | 170 | 70 | 90 | 160 | 220 |

By adopting a basic pattern pitch of the order of 50 mm and a pattern width Wm of 230 mm, a sipes density D of the order of 122 μm/mm², an orientation level NO of 2.44 degrees/mm, and a steering pull criterion CT of 0.025 can be calculated.

It will be noticed here that the shape of the raised elements 11*a*-11*k* and their arrangement on the tread are determined in such a way that the tread pattern design thus formed is asymmetric. The tire therefore has a predetermined direction of fitting so that one side wall of the tire is always on the outside of the vehicle irrespective of where (right or left) on the vehicle it is mounted. These tires generally bear a marking ("outside" or "inside") indicating to the user which side wall of the tire has to face towards the outside of the vehicle, which hereinafter will be termed the outboard side wall, and which side wall of the tire has to face towards the inside of the vehicle, hereinafter termed the inboard side wall. According to the markings on the tire, it is possible to determine in FIG. 4 an inboard half-tread 17 and an outboard half-tread 15. Specifically, the inboard half-tread is the half-tread adjacent to the inboard side wall and the outboard half-tread is the half-tread adjacent to the outboard side wall. It will be noticed that a median plane 19 separates the inboard half-tread 17 from the outboard half-tread 15.

In FIG. 4, the inboard half-tread comprises the seventh element 11*g*, the eighth element 11*h*, the ninth element 11*i*, the tenth element 11*j*, the eleventh element 11*k*. Likewise, the outboard half-tread comprises the first element 11*a*, the second element 11*b*, the third element 11*c*, the fourth element 11*d*, the fifth element 11*e* and the sixth element 11*f*.

It will be noted that the inboard half-tread plays an important role in the functioning of the tire because this is the part of the tread that is most heavily involved in providing grip on snowy ground, particularly under cornering. Thus, in order to improve this cornering grip, the sipes of the inboard half-tread are inclined more steeply with respect to the transverse direction. In particular, measures are taken to ensure that the orientation level NO of the sipes on the raised elements 11*g*-11*k* are greater than 2 degrees/mm. In the example of the table described hereinabove, and considering an inboard half-tread width of Wm/2, an orientation level of these sipes of the order of 3.43 degrees/mm can be determined.

The invention is not restricted to the examples described and depicted, and various modifications can be made thereto without departing from the scope thereof.

For example, it is possible to have sipes with different orientations within one and the same raised element of the basic pattern.

In another alternative form, the median plane does not divide the tread into two portions of the same axial width, so the term half-tread does not necessarily refer to half of the tread.

The invention having been described with reference to certain specific examples and embodiments, it will be understood that these do not limit the scope of the appended claims.

The invention claimed is:

1. An asymmetric tread for a tire adapted to be fitted to a motor vehicle in a predetermined direction of fitting, comprising:
   a tread surface adapted to be in contact with a roadway when the tire is being driven, and comprising an in-board half tread adjacent to an inboard sidewall of the tire and an outboard half-tread adjacent to an outboard sidewall of the tire;
   a sequence of basic patterns arranged in the circumferential direction (X), each basic pattern extending over at least 80% of the width (W) of the tread;
   each basic pattern comprising a plurality of raised elements provided with sipes opening onto the tread surface, each sipe having a width less than 1 mm and a depth of at least 3 mm;
   wherein:
   the following are defined for each basic pattern:
   a sipes density (D) corresponding to $$\frac{\sum_i li}{P * Wm}$$

where i is the number of sipes in the pattern, li is the length of the i$^{th}$ sipe on the tread surface, P is the pitch of the basic pattern and Wm is the width of the basic pattern;
   a sipes orientation level (NO) corresponding to $$\frac{\sum_i |li * \alpha i|}{P * Wm},$$

where $\alpha_i$ is the positive or negative angle formed on the tread surface by the $i^{th}$ sipe with the transverse direction and $|\alpha_i| \leq 45$ degrees;

a steering pull criterion for the basic pattern (CT) corresponding to $$\left| \frac{\sum_i l_i * \alpha_i}{\sum_i |l_i * \alpha_i|} \right|$$

wherein the sipes density (D) is greater than or equal to 60 μm/mm², the sipes orientation level (NO) is greater than or equal to 1.5 degrees/mm, and the steering pull criterion (CT) is less than or equal to 0.2, and wherein the sipes orientation level (NO) of the inboard half-tread is greater than 2 degrees/mm, such that the sipes of the inboard half-tread are inclined more steeply with respect to the transverse direction than the sipes of the outboard half-tread.

2. The asymmetric tread according to claim 1, wherein the steering pull criterion (CT) is less than 0.1.

3. The asymmetric tread according to claim 1, wherein the steering pull criterion (CT) is less than 0.05.

* * * * *